W. J. McCALLUM.
JAR HOLDER.
APPLICATION FILED JUNE 5, 1909.
936,927.
Patented Oct. 12, 1909.
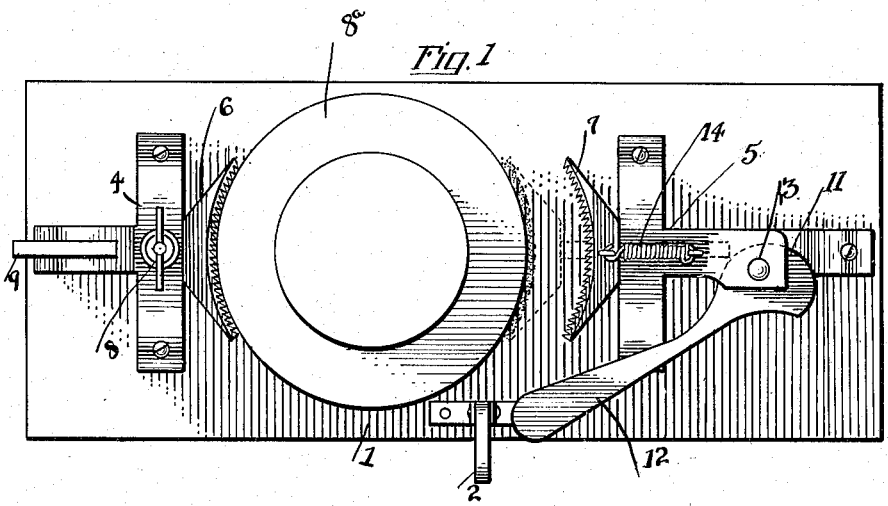
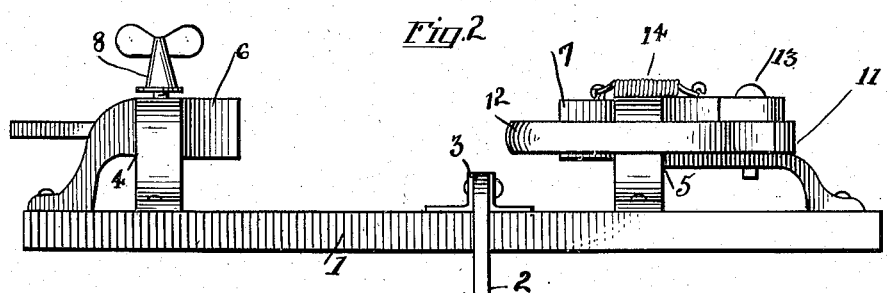
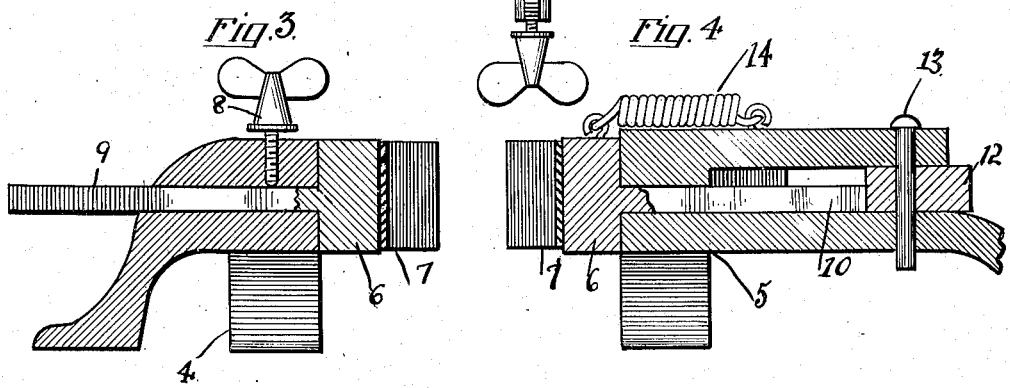
Witnesses
Wm Smith
U. B. Hillyard.
Inventor
William J. McCallum
By Victor J. Evans
Attorney

UNITED STATES PATENT OFFICE.

WILLIAM J. McCALLUM, OF FOND DU LAC, WISCONSIN.

JAR-HOLDER.

936,927.

Specification of Letters Patent.　Patented Oct. 12, 1909.

Application filed June 5, 1909. Serial No. 500,367.

*To all whom it may concern:*

Be it known that I, WILLIAM J. MCCALLUM, a citizen of the United States, residing at Fond du Lac, in the county of Fond du Lac and State of Wisconsin, have invented new and useful Improvements in Jar-Holders, of which the following is a specification.

This invention is designed to provide novel means for securing fruit jars when tightening the caps thereof which is adjustable so as to be readily adapted for jars of different sizes and adapted to securely hold the same without endangering fracture thereof.

A further purpose of the invention is to supply a device of the character and for the purpose aforesaid which is portable and capable of being secured to a table, bench or other supporting means and which embodies adjustable jaws which are clothed with rubber, felt or other material to prevent injurious pressure upon the sides of the jaws, one of the jaws being operable by means of a handle and adapted to be automatically withdrawn by means of a spring, the handle being of such formation at the operating end to provide a lock for holding the jaws in firm engagement with the jar when the latter is clamped so as to prevent turning thereof during the tightening of the cap.

The invention consists in the novel features, details of construction and combinations of parts, which hereinafter will be more particularly set forth, illustrated in the accompanying drawings and pointed out in the appended claims.

Referring to the drawings forming a part of the specification; Figure 1 is a top plan view of a jar holder embodying the invention. Fig. 2 is a front view thereof. Fig. 3 is a longitudinal section of the adjustable jaw and the mount therefor. Fig. 4 is a longitudinal section of the movable jaw, the mount therefor and the operating handle.

Corresponding and like parts are referred to in the following description and indicated in all the views of the drawings by the same reference characters.

The holder comprises a base 1 which may be of any construction and size and usually consists of a board or block of wood. A clamp 2 is provided at one side of the board for securing the same to a table, bench, shelf or the like, said clamp being pivoted to a pair of brackets 3 secured to the base 1 in any substantial way. By having the clamp pivoted to the base, it may be turned so as to lie thereon and occupy a small amount of space and by locating said clamp at one side of the base it may be secured to the edge portion of a table, shelf or the like.

Brackets 4 and 5 are secured to opposite end portions of the base and constitute mounts for receiving and supporting the jaws 6 and 7. The jaws 6 and 7 are of similar formation, their gripping faces being concave so as to conform to the outer surface of the jar $8^a$ adapted to be clamped between said jaws. To prevent injurious and dangerous pressure of the jaws against the sides of the jar, said jaws are supplied with a covering of rubber, felt or like material and said yieldable material is roughened or corrugated as indicated most clearly in Fig. 1 to prevent slipping of the jar upon the application of force to tighten the cap or cover thereof. Each of the jaws is provided with a stem which is slidably mounted in the respective mount or bracket. A set-screw 8 threaded into the upper portion of the bracket or mount 4 is adapted to engage at its inner end with the stem 9 of the jaw 6 thereby holding the latter in the adjusted position. The stem 10 of the jaw 7 is adapted to be engaged by the cam 11 at the inner end of the operating handle 12 which is pivoted at 13 to the mount 5. The cam 11 is of such formation as to gradually move the jaw 7 and to lock the same when the jaw has reached a position to grip the jar $8^a$ between the two jaws. A retractile spring 14 of the helical type is secured at one end to the jaw 7 and at its opposite end to the mount 5 and serves to automatically withdraw the jaw 7 from engagement with the jar when the operating handle 12 is moved to normal position.

It is to be understood that the jaw 7 has a given movement for each sized jar so that when the operating handle 12 reaches the limit of its movement in one direction, it forms a lock with said jaw to hold the latter in clamping position. When the operating handle 12 is in the position shown in Fig. 1, the jaw 7 is at the limit of its outward movement but when the operating handle 12 is moved to a position to aline with the stem 10 of the jaw 7, the end of the cam 11 abuts squarely against the stem 10 and holds the jaw 7 in forward position or in clamping engagement with the jar $8^a$. The jaw 6 is adjustable to adapt the holder for different sizes of jars and after the jaw 6 has been set for the jar of a given size it is secured by means of the set-screw 8 and remains relatively fixed, the jaw 7 only being movable by the action of the operating handle 12 and the spring 14, the latter withdrawing the jaw 7 when the operating handle 12 is returned to normal position and said operating handle advances the jaw 7 after the jar has been placed in position upon the base 1.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what is claimed is—

1. In combination, a base, mounts secured upon the base, jaws having stems slidable in the respective mounts, means for securing one of the jaws in the adjusted position, an operating lever pivoted to the other mount and adapted to engage a stem of the jaw supported thereby and arranged to move in a plane parallel with the base to advance the jaw and hold the same in clamping position.

2. A jar holder comprising a base, a clamp pivotally connected to the side of the base intermediate of its ends, mounts secured upon opposite end portions of the base, jaws having stems slidable in the respective mounts, means for securing one of the jaws to its mount in the adjusted position, a spring for retracting the other jaw, and an operating lever pivoted to move in a plane parallel with the base, and having a cam head to engage with the stem of the jaw to advance the latter and hold the same in clamping position.

In testimony whereof I affix my signature in presence of two witnesses.

WILLIAM J. McCALLUM.

Witnesses:
 SUSAN STROUD,
 ROBT. H. CROSBY.